(12) United States Patent
Kim

(10) Patent No.: US 6,930,783 B2
(45) Date of Patent: Aug. 16, 2005

(54) METHOD OF ALIGNING OPTICAL SYSTEM USING A HOLOGRAM AND APPARATUS THEREFOR

(75) Inventor: Tae-hee Kim, Gyeonggi-do (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 372 days.

(21) Appl. No.: 10/246,541

(22) Filed: Sep. 19, 2002

(65) Prior Publication Data

US 2003/0067684 A1 Apr. 10, 2003

(30) Foreign Application Priority Data

Oct. 6, 2001 (KR) .................................... 2001-0061641

(51) Int. Cl.$^7$ ................................................ G01B 9/02
(52) U.S. Cl. ...................................... 356/508; 356/458
(58) Field of Search ................................ 356/399, 400, 356/401, 457, 458, 508, 510; 355/53, 55; 430/5, 22, 30

(56) References Cited

U.S. PATENT DOCUMENTS

| | | | | |
|---|---|---|---|---|
| 4,396,289 A | * | 8/1983 | Fantone | 356/458 |
| 4,783,055 A | * | 11/1988 | Widen et al. | 356/457 |
| 5,039,223 A | * | 8/1991 | Gemma et al. | 356/458 |
| 6,559,948 B1 | * | 5/2003 | Stenton | 356/457 |
| 6,563,592 B2 | * | 5/2003 | Mitchell et al. | 356/508 |

* cited by examiner

Primary Examiner—Gregory L. Toatley, Jr.
Assistant Examiner—Michael A. Lyons
(74) Attorney, Agent, or Firm—Staas & Halsey LLP.

(57) ABSTRACT

A method of aligning an optical system and an optical system incorporating the method. A hologram element is installed in the optical system so that test beams diffracted by the hologram element travel along a same optical path as test beams incident on the optical system. Alignment errors in the optical system are measured using interference patterns formed on an image surface by test beams returned from the optical system and reference beams. At least one optical element of the system is aligned using measurements calculated from the interference patterns. The optical system may provide for temporarily installing the hologram element to perform the measurements or the optical system may be constructed with a hologram formed on any optical element which may require alignment. A direction and a magnitude of any misalignment are determinable based on an appearance of the pattern and a number of circles in the pattern, respectively.

23 Claims, 7 Drawing Sheets

METHOD OF ALIGNING OPTICAL SYSTEM USING A HOLOGRAM AND APPARATUS THEREFOR

CROSS-REFERENCE TO RELATED APPLICATIONS

This application claims the benefit of Korean Application No. 2001-61641 filed Oct. 6, 2001, in the Korean Industrial Property Office, the disclosure of which is incorporated herein by reference.

BACKGROUND OF THE INVENTION

1. Field of the Invention

The present invention relates to a method of aligning an optical system and an apparatus therefor, and more particularly, to a method of and an apparatus for easily aligning an optical system using a computer-generated hologram (CGH) and aligning elements.

2. Description of the Related Art

In general, an alignment of an optical system is achieved by aligning optical elements of the optical system and mechanically adjusting positions of the optical elements so that the optical system has an image quality within a prescribed tolerance. The conventional technique for aligning the optical system does not directly measure errors of the optical system, but measures light intensity representing the image quality to realign the optical elements where the image quality deviates from a tolerance limit.

In the conventional method of aligning the optical system, an additional unit is necessary to measure the image quality and the optical system is realigned by measuring the image quality and indirectly calculating the alignment errors of the optical system. Thus, it is difficult to accurately calculate the alignment errors and errors may occur in realigning the optical system.

In the conventional technique, optical elements are aligned through mechanical manipulation, which results in a slack alignment of the optical elements, and an additional alignment unit is necessary to perform the alignment. Thus, the configuration of the conventional apparatus becomes complicated and the manufacturing cost increases.

SUMMARY OF THE INVENTION

To solve the above-described problems, it is an object of the present invention to provide a method of precisely aligning an optical system in real time and in an accurate manner by removing errors occurring through mechanical manipulation of optical elements of the optical system, and associated aligning elements.

Additional objects and advantages of the invention will be set forth in part in the description which follows, and, in part, will be obvious from the description, or may be learned by practice of the invention.

Accordingly, to achieve the above and other objects, there is provided a method of aligning an optical system. An optical element and a hologram element are installed in a barrel. Alignment errors of the optical element are measured from interference patterns formed on an image surface by reference beams and test beams. The optical element is aligned to remove the alignment errors.

The hologram element is a computer-generated hologram element which is manufactured according to the tolerance of the optical system so that test beams travel in a same optical path as an incident path.

The barrel may further include a unit for installing the computer-generated hologram element.

The optical element may be installed in front of the computer-generated hologram element, wherein the test beams transmitted through the optical element are reflected on the computer-generated hologram element and travel on the same optical path.

Alternatively, the optical element may be installed after the computer-generated hologram element, wherein the test beams transmitted through the computer-generated hologram element are perpendicularly reflected on an incident surface of the optical element and travel on the same optical path.

The alignment errors of the optical element are measured from errors of the interference patterns with respect to null interference patterns.

To achieve the above and other objects, there is provided an optical system comprising at least one optical element with a hologram for diffracting test beams on the same optical path.

The hologram may be a computer-generated hologram.

To achieve the above and other objects, there is provided a method of aligning an optical system. An optical element with a hologram is aligned in a barrel so that test beams travel on the same optical path as an incident path. Alignment errors of the optical element are measured from interference patterns formed by reference beams and the test beams. The optical element is aligned to remove the alignment errors.

The hologram may be a computer-generated hologram.

The alignment errors of the optical element are measured from errors of the interference patterns with respect to null interference patterns.

To achieve the above and other objects, there is provided a method of testing a barrel. A hologram element is placed in a predetermined position of the barrel and a predetermined lens is installed in a designated position of an optical element. A manufacturing condition of the barrel is measurable from interference patterns formed by reference beams and test beams.

The hologram element is manufactured according to the tolerance of an optical element so that the test beams travel in the same optical path as an incident path.

The hologram element may be a computer-generated hologram element.

The barrel may include a unit for installing the computer-generated hologram element.

The predetermined lens may be a spherical lens for measuring the manufacturing condition of the barrel.

Where the predetermined lens is installed in front of the computer-generated hologram element, the test beams transmitted through the predetermined lens are reflected along the same optical path as an incident path.

Where the predetermined lens is installed after the computer-generated hologram element, the test beams transmitted through the computer-generated hologram are perpendicularly reflected on an incident surface of the predetermined lens and travel on the same optical path as an incident path.

The manufacturing condition of the barrel is measurable from errors of the interference patterns with respect to null interference patterns.

An optical system according to the present invention includes at least one optical element with a hologram element placed in a predetermined position of a barrel so that test beams travel on the same optical path as an incident path.

The hologram element may be a computer-generated hologram element.

To achieve the above and other objects, there is provided an optical system comprising at least one optical element with a unit for placing a hologram element in a predetermined position of a barrel.

The hologram element measures a manufacturing condition of the barrel or aligns the at least one optical element.

The hologram element may be a computer-generated hologram element.

The present invention provides a method of aligning an optical system using a computer-generated hologram in real time and in an accurate manner and a measured manufacturing condition of a barrel. Also, the present invention provides an optical element which is directly aligned and simultaneously used by writing a hologram directly on the optical element, and a method of aligning the optical system.

Alignment errors of the optical system include a defocus error, a decenter error, a tip error, and a tilt error. The defocus error occurs where light rays are bent toward an optical axis by more or less than a correct amount as in focusing or defocusing the system. The decenter error occurs where the center of the optical element is not aligned with the optical axis of the system. The tip error occurs where the optical element is inclined on an X-axis. The tilting error occurs when the optical element is inclined on a Y-axis.

The alignment of the optical system represents the arrangement of optical elements constituting the optical system without the defocus, decenter, tip and tilt errors.

BRIEF DESCRIPTION OF THE DRAWINGS

The above object and advantages of the present invention will become more apparent by describing in detail preferred embodiments thereof with reference to the attached drawings in which.

DESCRIPTION OF THE PREFERRED EMBODIMENTS

Figure 1:
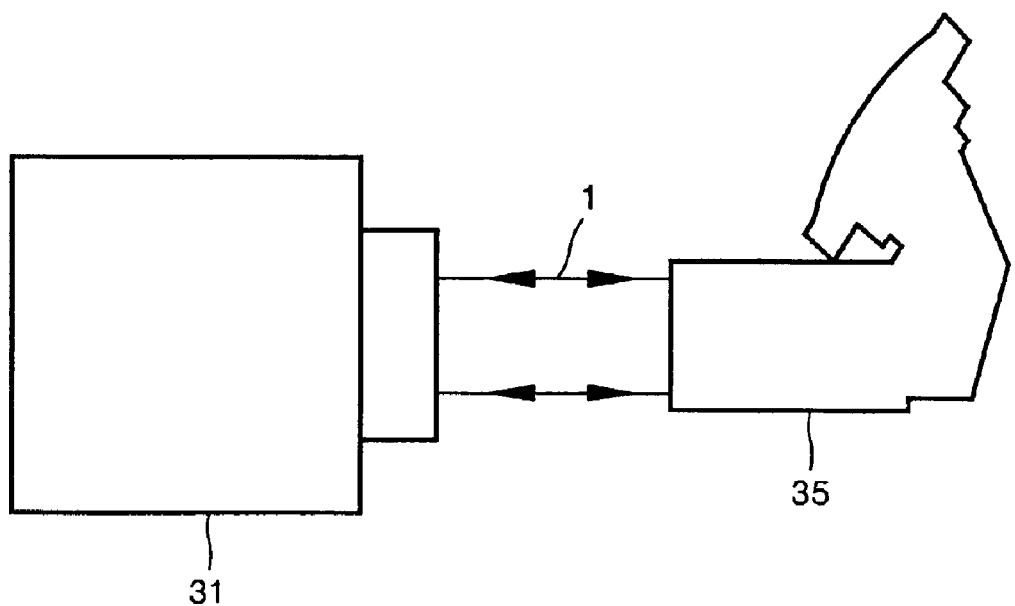
FIG. 1 is a schematic view of an optical projection system using a method of aligning an optical system according to a first embodiment of the present invention.

Reference will now be made in detail to the present embodiments of the present invention, examples of which are illustrated in the accompanying drawings, wherein like reference numerals refer to like elements throughout. Embodiments of a method of aligning an optical system, an optical system having aligned elements, and a method of testing a barrel according to the present invention will be described in detail.

Figure 3:
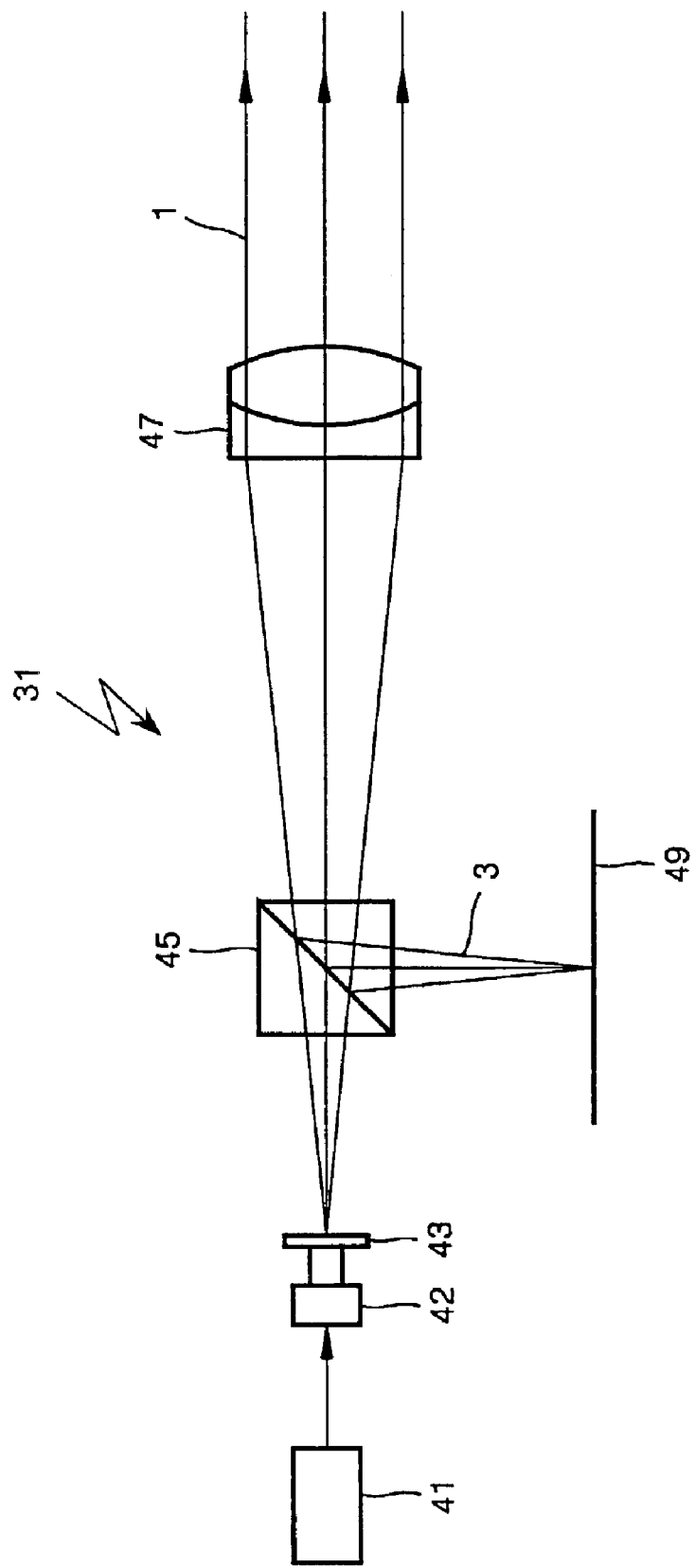
FIG. 3 is a schematic view of an interferometer useable in the method of aligning the optical system according to the embodiments of the present invention.

FIG. 1 is a schematic view of an optical projection system using a method of aligning an optical system having a hologram element, i.e., a computer-generated hologram (CGH) element, according to a first embodiment of the present invention. FIG. 3 shows a more detailed view of a Fizeau interferometer.

Referring to FIGS. 1 and 3, in an embodiment of an optical system, a method of aligning the optical system, and a method of testing a barrel according to the present invention, a Fizeau interferometer 31 forms test beams 1 and reference beams 3 from a light source 41. An optical projection system 35 has optical elements on which the test beams 1 transmitted through the Fizeau interferometer 31 are incident.

Alternatively, another type of interferometer may be used as the interferometer 31. Also, the present invention is described with reference to a method of aligning an optical projection system but the principles thereof may be applied to an alignment of another type of optical system.

The Fizeau interferometer 31 is positioned in front of the optical projection system as shown in FIG. 1 and generates the test beams 1 and the reference beams 3 necessary for the method of aligning the optical system and the method of testing a barrel.

The test beams 1 emitted from the Fizeau interferometer 31 are incident on the optical projection system 35 which is positioned rearward of the Fizeau interferometer 31. Here, the optical elements which are components of the optical system are lenses or mirrors, but not a CGH.

Referring to FIG. 3, the Fizeau interferometer 31 includes a light source 41, a condensing lens 42, a filter 43, a beam splitter 45, and a collimating lens 47. The condensing lens 42 condenses beams generated from the light source 41. The filter 43 transmits only ones of the specific wavelengths of the incident beams. The beam splitter 45 splits an optical path into two optical paths so that some of the incident beams, the reference beams 3 travel toward an image surface 49 and the test beams 1 travel toward the optical projection system 35. The collimating lens 47 collimates the test beams 1. The light source 41 may generate laser beams, some of which are the test beams 1 and some of which are the reference beams 3.

The condensing lens 42 condenses the laser beams generated by the light source 41 and transmits the condensed laser beams to the beam splitter 45. The filter 43 is positioned on an optical path between the condensing lens 42 and the beam splitter 45 and is adapted to transmit only incident beams having optimum light intensity within a predetermined frequency range.

The beam splitter 45 changes the optical path of the reference beams 3 of the incident beams to an angle of 90° so that the reference beams 3 travel toward the image surface 49 and transmits the test beams 1, without alteration of the optical path, toward the optical projection system 35.

The collimating lens 47 collimates the test beams 1 transmitted through the beam splitter 45. Also, a lens (not shown) is positioned in front of the collimating lens 47 to assist in making the test beams 1 transmitted through the collimating lens 47 into convergent light beams.

The test beams 1 are transmitted to the optical projection system 35 through the Fizeau interferometer 31, are reflected by an optical element or a CGH element of the optical projection system 35, and are incident again on the Fizeau interferometer 31. The beam splitter 45 changes the optical path of the reflected test beams 1 incident again on the Fizeau interferometer 31 to an angle of 90° so that the reflected test beams 1 travel toward the image surface 49 and form interference patterns with the reference beams 3 on the image surface 49.

Figure 2:
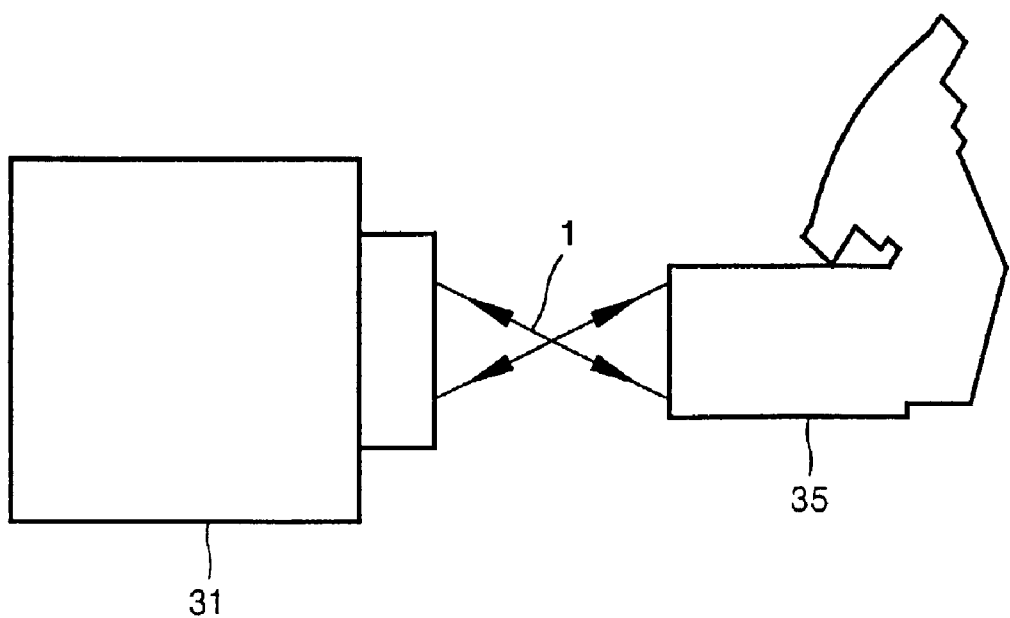
FIG. 2 is another schematic view of the optical projection system using a method of aligning the optical system according to a second embodiment of the present invention.

Referring to FIG. 2, in the optical projection system using the optical system, the method of aligning the optical system, and the method of testing the barrel according to the present invention, convergent light beams may be used rather than collimated light beams as the test beams transmitted through the Fizeau interferometer 31. The convergent light beams may be formed by positioning an optical lens in front of the collimating lens 47 of the Fizeau interferometer 31, as described above. The structure and function of the optical system 35 shown in FIG. 2 are the same as the structure and function of the optical system 35 described with reference to FIG. 1.

Figure 4:
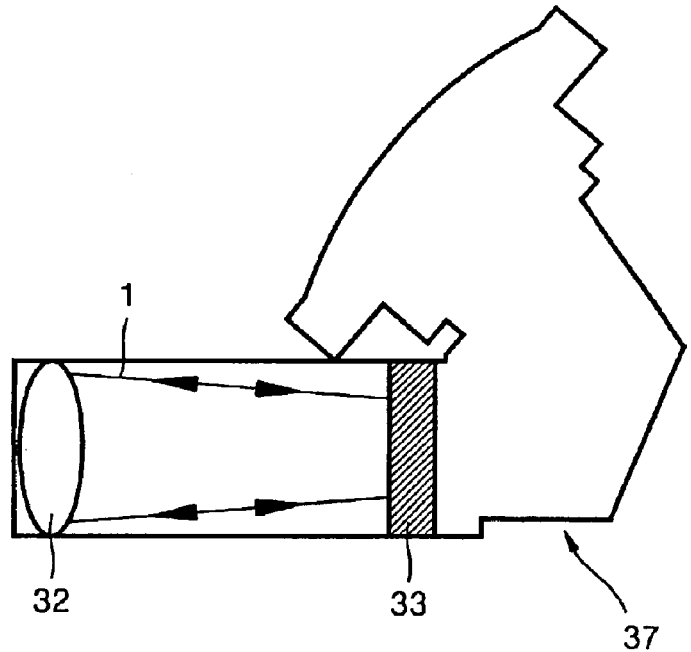
FIG. 4 is a schematic view illustrating a method of testing a barrel according to the present invention.
Figure 5:
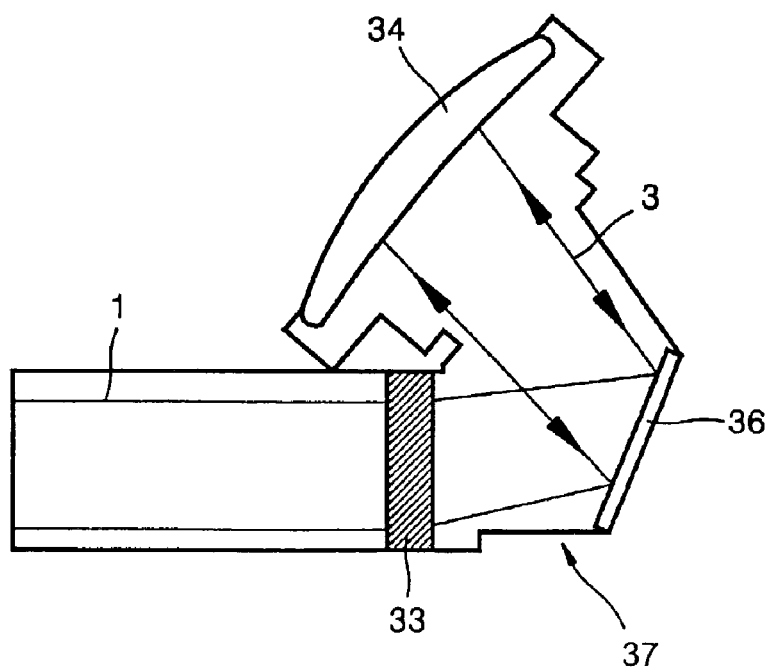
FIG. 5 is a schematic view illustrating another method of testing a barrel according to the present invention.

FIGS. 4 and 5 are schematic views illustrating a method of testing a barrel to measure the manufacturing condition of the barrel in which an optical element is installed. Referring to FIGS. 4 and 5, in the method of testing the barrel according to embodiments of the present invention, a hologram element, i.e., a CGH element 33, is manufactured to reflect test beams 1 along an optical path which is the same as an optical path of incident test beams 1. The CGH element 33 is placed in a predetermined position of a barrel 37. In the embodiment shown in FIG. 4, a predetermined lens 32 is installed in a designated position of an optical element, and the manufacturing condition of the barrel 37 is measured from interference patterns formed by the reference beams 3 and the reflected test beams 1 emitted from the predetermined lens 32. In the embodiment shown in FIG. 5, a predetermined lens 34 is installed in a designated position of another optical element, and the manufacturing condition of the barrel 37 is measured from the interference patterns formed by the reference beams 3 and the test beams 1 reflected by the predetermined lens 34 and emitted from the CGH element 33. The CGH element 33 is manufactured in consideration of a tolerance limit of image quality.

As shown in FIG. 4, the predetermined lens 32 is manufactured to the same size as a diameter and a thickness of an edge of an optical element which will be installed in the barrel 37 and is designed to have an optimum curvature radius so that beams are incident on an accurate predetermined position of the CGH element 33. The predetermined lens 32 is manufactured in consideration of each optical element and is installed in a designated position where optical elements are placed to measure the manufacturing condition of the barrel 37.

The CGH element 33 is manufactured so as to reflect the test beams 1 transmitted from the predetermined lens 32 so that the test beams 1 travel inversely with respect to optical path where the predetermined lens 32 is positioned in front of the CGH element 33.

Where the predetermined lens 34 is positioned after the CGH element 33 as shown in FIG. 5, the CGH element 33 is manufactured so that the test beams 1 are transmitted to the CGH 33, reflected on a mirror 36, are perpendicularly incident and reflected on an incident surface of the predetermined lens 34, and travel inversely with respect to the optical path, and transmitted to the interferometer 31 through the CGH element 33.

The CGH element 33 may be ring-shaped or fan-shaped depending on the optical path of the test beams 1 transmitted through the predetermined lens 32. The barrel 37 may include an additional unit so as to install the CGH element 33.

Referring to FIG. 4, the predetermined lens 32 is specially manufactured to measure the manufacturing condition of the barrel 37. Also, the predetermined lens 32 is placed in a designated position of each optical element that will be positioned in front of a hologram element, i.e., the CGH element 33, to retransmit the test beams 1 reflected by the CGH element 33 to the Fizeau interferometer 31.

Referring to FIG. 5, the predetermined lens 34 is placed in a designated position of each optical element after the CGH element 33. The test beams 1 transmitted through the CGH element 33 are perpendicularly incident, are reflected on an incident surface of the predetermined lens 34 according to the reflection law, change direction to an inverse direction, and are thus transmitted to the Fizeau interferometer 31.

As described above, the test beams 1 which are incident on the Fizeau interferometer 31 from the optical projection system 35 form interference patterns with the reference beams 3 on the image surface 49. If these interference patterns are null interference patterns, the barrel 37 is determined to be manufactured to a design parameter. If the interference patterns are not null interference patterns, the barrel 37 is determined not to be manufactured to the design parameter. Manufacturing errors of the barrel 37 are correctable based on shapes of the interference patterns.

Figure 6:
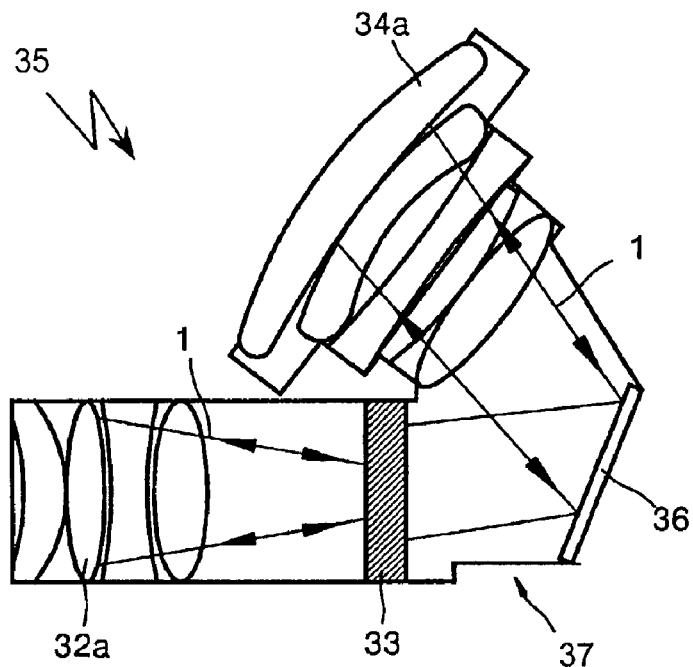
FIG. 6 is a schematic view illustrating an optical system and a method of aligning the optical system according to a first embodiment of the present invention.

FIG. 6 is a schematic view illustrating an optical system 35 in which a hologram element, i.e., a CGH element, is additionally installed and a method of aligning the optical system according to an embodiment of the present invention. Referring to FIG. 6, the optical system according to the embodiment of the present invention includes at least one optical element 32a on which test beams 1 are incident from an interferometer 31 and a barrel 37 having a hologram element. The hologram element is a CGH element 33. To install the CGH element 33, an additional unit may be prepared in the barrel 37.

Referring to FIG. 6, in the method of aligning the optical system, a hologram element, i.e., the CGH element 33, is manufactured to reflect test beams 1 along a same optical path as an incident path of the test beams 1. Optical elements 32a and 34a are installed in the barrel 37 and alignment errors of the optical elements 32a and 34a are measurable from interference patterns formed by reference beams 3 (FIG. 3) and test beams 1 transmitted through the optical element 32a and reflected by the CGH element 33 or transmitted through the CGH element 33 and reflected by the optical elements 34a. Finally, the optical elements 32a and 34a are aligned to remove the alignment errors. The CGH element 33 is manufactured in consideration of a tolerance limit of image quality.

The CGH element 33 used in the method of aligning the optical system according to the embodiment of the present invention is manufactured by the same method as the CGH element 33 in the method of testing the barrel. In other words, the CGH element 33 is manufactured so that the CGH element 33 is written in a position where test beams 1 transmitted through the optical elements 32a and 34a are incident. Light beams transmitted through the optical element 32a positioned in front of the CGH element 33 are reflected along the same optical path, and light beams transmitted through the optical element 34a positioned behind the CGH element 33 are reflected along the same optical path.

Alignment errors of the optical system are measurable after the optical elements 32a and 34a are both arranged in the barrel 37 or after the optical elements 32a and 34a are separately installed.

Similar to the method of testing the barrel, in the method of aligning the optical system where the CGH element 33 is additionally installed, alignment errors of the optical system are measurable from errors of the reference patterns with respect to null interference patterns formed by the reference beams 3 generated from the interferometer 31 and the test beams 1 returned from the optical system 35.

Figure 7:
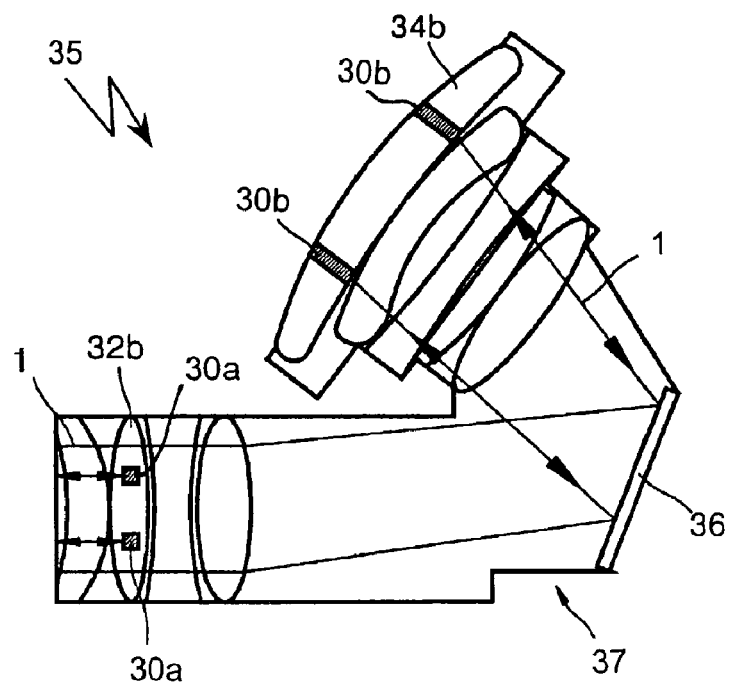
FIG. 7 is schematic view illustrating another optical system and a method of aligning the optical system according to a second embodiment of the present invention.

FIG. 7 is a schematic view illustrating an optical system using optical elements on which a CGH is written, according to the embodiment of the present invention, and a method of aligning the optical system. Referring to FIG. 7, holograms 30a and 30b are written directly on optical elements 32b and 34b, respectively. The holograms may be computer-generated holograms.

The CGH 30a and the CGH 30b which are designed through computer simulation are written on the optical elements 32b and 34b, respectively, so that the test beams 1 are incident on the optical elements 32b and 34b and are reflected in the same optical path as the incident path. The CGH 30a and the CGH 30b may be written around the respective peripheral areas of the optical elements 32b and 34b so as not to degrade the quality of an image formed by beams transmitted through the optical elements 32b and 34b.

Referring to FIG. 7, in the method of aligning the optical system according to the embodiment of the present invention, a hologram is formed on the optical elements 32b and 34b so that the test beams 1 travel in the same optical path as the incident path. The optical elements 32b and 34b are arranged in the barrel 37, and alignment errors of the optical elements 32b and 34b are measured from interference patterns which are formed on the image surface 49 by the reference beams 3 and the test beams 1 transmitted through the optical elements 32b and 34b. Finally, the optical elements 32b and 34b are aligned to remove the alignment errors. The hologram formed on each optical element may be a CGH.

The test beams 1 are incident on and reflected by the respective CGH formed on the optical elements 32b and 34b, change optical paths to an inverse direction of the incident direction, and interfere with the reference beams 3 of the interferometer 31 shown in FIG. 3 to form an interference pattern on the image surface 49.

As described above, where the test beams 1 and the reference beams 3 form a null interference pattern in the method of aligning the optical system in which the CGH is additionally installed or in the method of testing the barrel, the optical system is determined to be correctly aligned. However, where another type of interference pattern is formed, alignment errors are determined to occur in the optical system.

Figure 8:
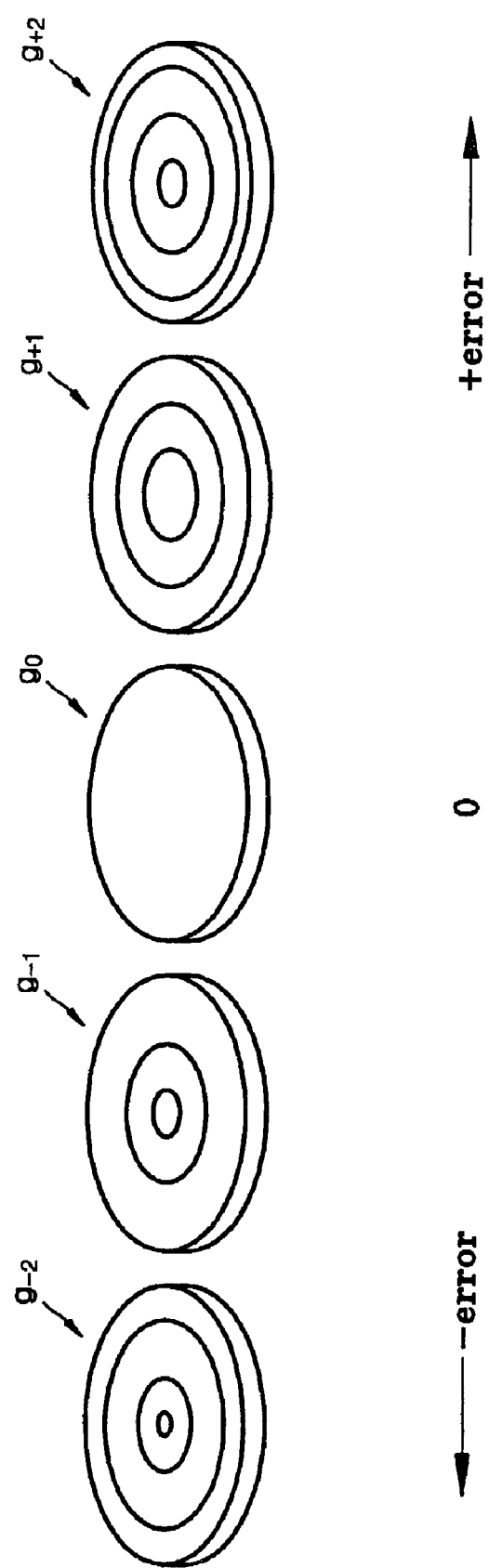
FIG. 8 is a view showing interference patterns resulting from alignment or manufacturing errors.
Figure 9:
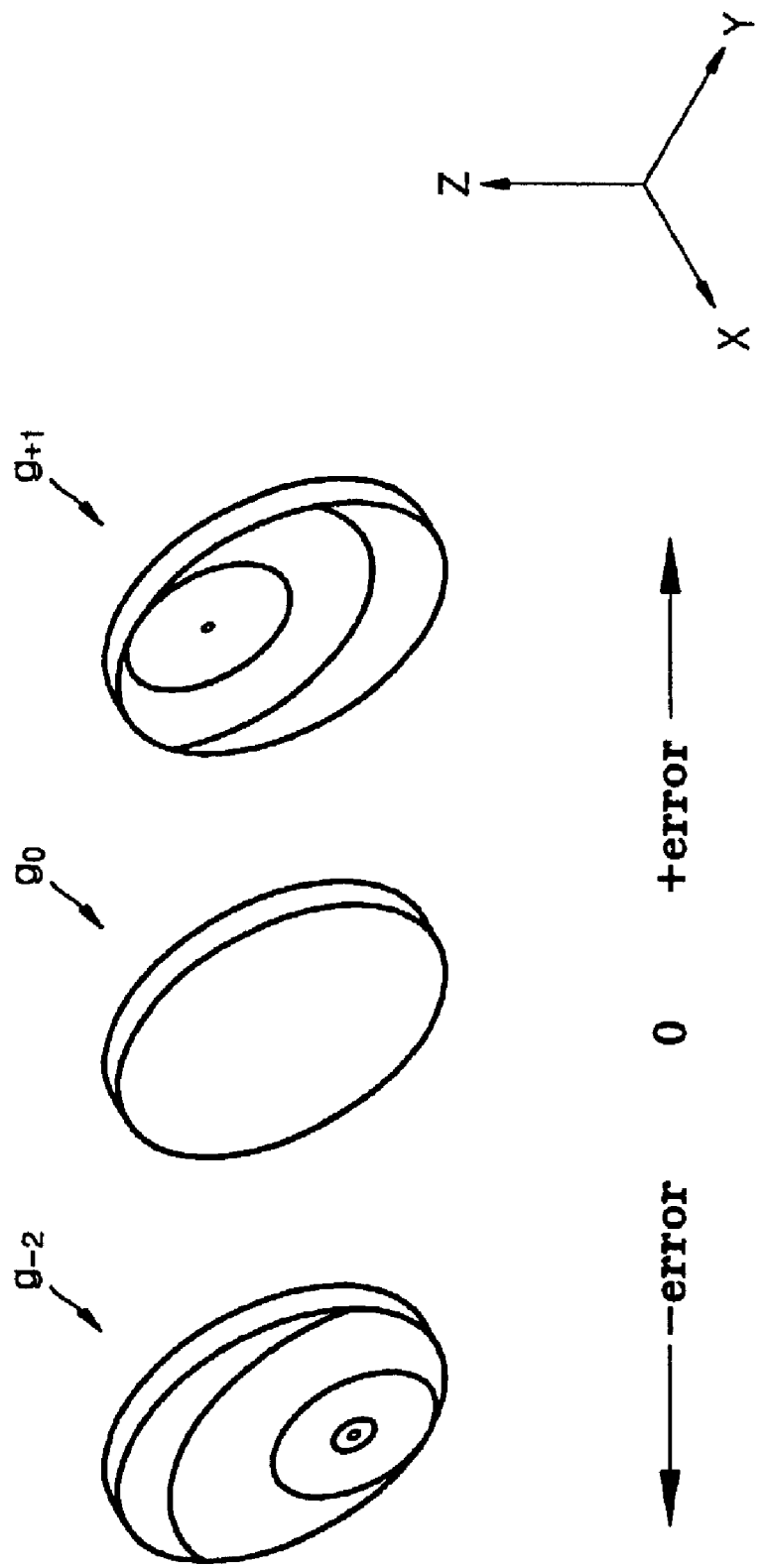
FIG. 9 is view showing interference patterns resulting from decentering errors in a first direction.
Figure 10:
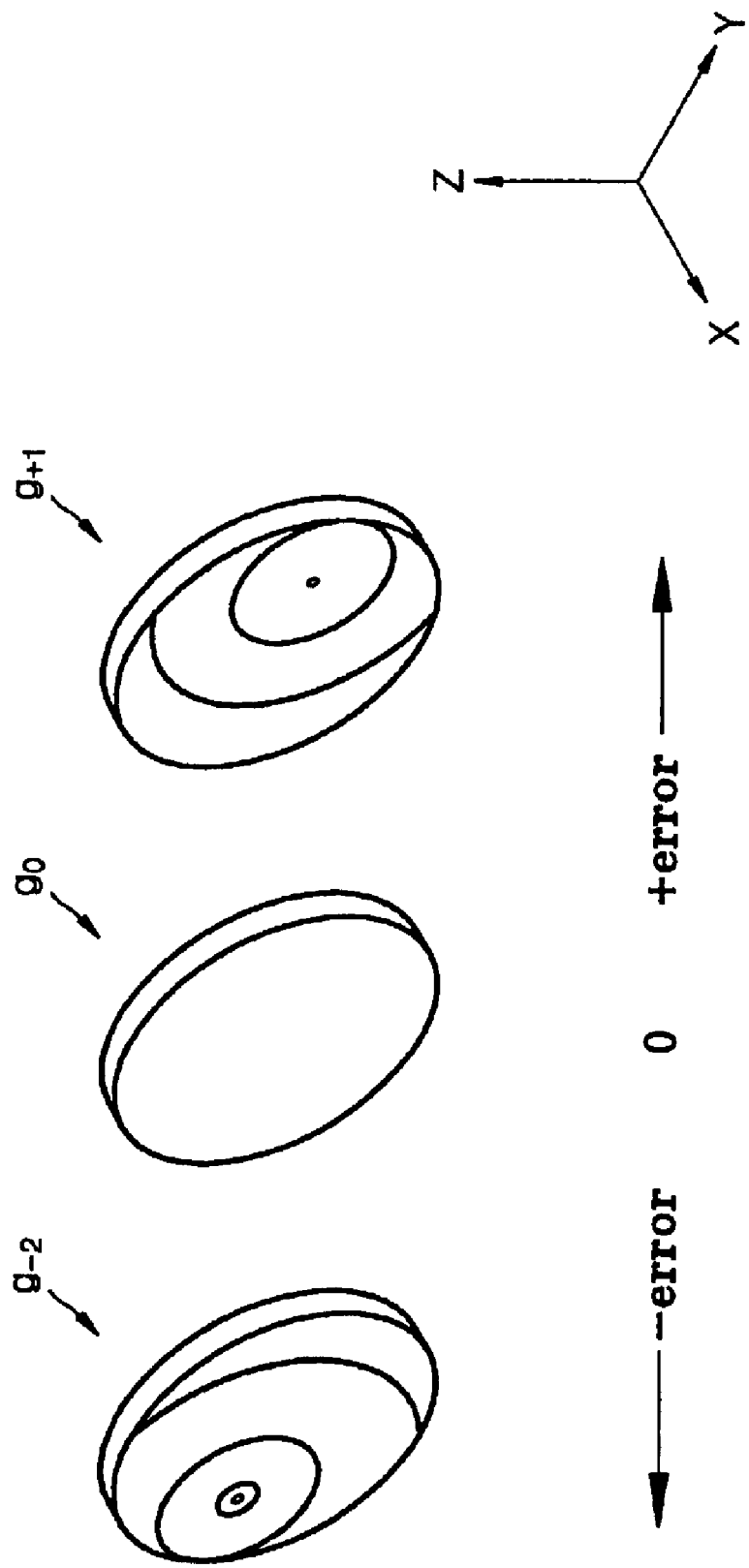
FIG. 10 is a view showing interference patterns resulting from decentering errors in a second direction.

Manufacturing errors of the barrel or alignment errors of the optical system contribute to the defocus, tip, tilt, or decenter errors of the optical system. FIGS. 8 through 10 illustrate interference patterns formed on the image surface 49 by the errors. Errors may be calculated by equation 1 which is applicable to all of the above-described errors.

$$\Delta E = \lambda/2 \times (\text{number of interference patterns}) \quad (1)$$

Referring to FIG. 8, it can be seen that a number of interference patterns increases with an increase in the error. The −errors shown, $g_{-2}$ and $g_{-1}$, indicate that the optical elements are close to the X-axis direction of the interferometer, while the +errors shown, $g_{+1}$ and $g_{+2}$, indicate the opposite.

A null interference pattern $g_0$ shown in FIG. 8 is formed where optical system alignment errors or barrel test errors do not occur. The shape of the circle of the null interference pattern $g_0$ represents the shape of the image surface, which means that an interference pattern is not formed.

Interference patterns $g_{+1}$ and $g_{+2}$ are created where the optical system alignment errors or the barrel test errors are in a +error direction. Where errors occur, interference patterns increase by one or by two, and circles of the interference patterns become larger and spread out in a form of waves.

If two circles occur as in the interference pattern $g_{+1}$ of FIG. 8, an error $\Delta E$ determined according to equation 1 equals $\lambda$, where $\lambda$ is the wavelength of the beam. In the same manner, if three circles occur as in the interference pattern $g_{-2}$ shown in FIG. 8, the error $\Delta E$ determined according to equation 1 is 1.5 $\lambda$. The black and white colors of interference patterns corresponding to the −error are interchanged with the black and white colors of the interference patterns corresponding to the +error direction.

FIGS. 9 and 10 show interference patterns created where decentering error occurs in the method of aligning the optical system or the method of testing the barrel. Referring to FIG. 9, where the center of the optical axis of the optical element moves upward on the Z-axis, as shown in FIG. 9, an interference pattern $g_{+1}$ is created in the +error direction. Where the center of the optical axis of the optical element moves downward on the Z-axis, as shown in FIG. 9, an interference pattern $g_{-2}$ is created in the −error direction.

Referring to FIG. 10, where the center of the optical axis of the optical element moves along the Y-axis in a positive direction, as shown in FIG. 10, an interference pattern $g_{+1}$ is created in the +error direction. Where the center of the optical axis of the optical element moves along the Y-axis in a negative direction, as shown in FIG. 10, an interference pattern $g_{-2}$ is created in the −error direction.

If tip or tilting error occurs in the method of aligning the optical system or the method of testing the barrel, the interference patterns shown in FIG. 9 are created. The errors can be calculated from equation 1 according to the number of interference patterns, as described above.

In the method of aligning the optical system and the method of testing the barrel according to the embodiment of the present invention, the manufacturing condition of the barrel or the alignment errors of the optical system are measurable in real time and in an accurate manner using a CGH.

In particular, in the optical system and the method of aligning the optical system according to the present invention, the CGH is not installed as an additional element, but the CGH is directly written on the optical element to simplify the configuration of the optical system. Also, since the CGH which is written directly on one or more elements of the optical system becomes a part of the optical system as sold, errors are prevented from initially occurring and the CGH may be used by a customer to aid in any realignment of the optical system without adding another element to the system.

As described above, the method of aligning the optical system or the method of testing the barrel may be applied to an optical system easily and accurately measure alignment or manufacturing errors of the optical system in real time.

Also, the aligned optical elements and the method of aligning the optical system allow measuring the alignment errors in optical systems in real time and in an accurate manner. Further, since an additional unit is unnecessary for the CGH, the configuration of the optical system is simplified and errors are remarkably reduced.

Although a few embodiments of the present invention have been shown and described, it would be appreciated by those skilled in the art that changes may be made in these embodiments without departing from the principles and spirit of the invention, the scope of which is defined in the claims and their equivalents.

What is claimed is:

1. A method of aligning an optical system having at least one optical element, the method comprising:

installing a hologram element on a same optical path as the at least one optical element;

measuring alignment errors of the optical element from interference patterns formed on an image surface by test beams returned from the optical system and reference beams; and aligning the at least one optical element to remove the alignment errors.

2. The method of claim 1, wherein the installing of the hologram element comprises installing a computer-generated hologram element.

3. The method of claim 2, wherein the method comprises:

removing the computer-generated hologram element from the optical system after the aligning of the at least one optical element.

4. The method of claim 1, wherein the installing of the hologram element comprises installing a hologram element which is manufactured according to a tolerance of the optical system so that the test beams returned from the optical system travel in a same optical path as an optical path of test beams incident on the optical system.

5. The method of claim 1, wherein the method further comprises:

installing the computer-generated hologram element behind the at least one optical element, transmitting the test beams through the at least one optical element, and reflecting the test beams from the computer-generated hologram element to travel on the same optical path.

6. The method of claim 1, wherein the method comprises:

installing the computer-generated hologram element in front of the at least one optical element, transmitting the test beams through the computer-generated hologram element, and perpendicularly reflecting the test beams from an incident surface of the at least one optical element to travel on the same optical path.

7. The method of claim 1, wherein the measuring of the alignment errors comprises:

measuring the alignment errors of the at least one optical element according to a difference between the interference patterns and null interference patterns.

8. A method of aligning an optical system having an optical element installed in a barrel, the method comprising:

providing a hologram element;

aligning the optical element with the hologram element in the barrel so that test beams returned from the barrel travel on a same optical path as an incident path of the test beams onto the barrel;

measuring alignment errors of the optical element from interference patterns formed by reference beams and the returned test beams; and aligning the optical element to remove the alignment errors.

9. The method of claim 8, wherein the providing of the hologram element comprises providing a computer-generated hologram.

10. The method of claim 8, wherein the measuring of the alignment errors of the optical element further comprises measuring the alignment errors according to a difference between the interference patterns and null interference patterns.

11. A method of testing a barrel for housing an optical system, the method comprising:

placing a hologram element in a predetermined position of the barrel, installing a predetermined lens in a designated position of an optical element, and measuring a manufacturing condition of the barrel according to interference patterns formed by test beams returned from the barrel and reference beams.

12. The method of claim 11, wherein the placing of the hologram element in the barrel further comprises:

providing a hologram element which is manufactured according to a tolerance of an optical element so that the returned test beams travel on a same optical path as an incident path of the test beams on the barrel.

13. The method of claim 11, wherein the placing of the hologram element in the barrel further comprises:

providing a computer-generated hologram element as the hologram element.

14. The method of claim 13, wherein the method further comprises:

installing the computer-generated hologram element in a unit of the barrel.

15. The method of claim 13, wherein the installing of the predetermined lens comprises installing a spherical lens.

16. The method of claim 13, wherein the installing of the predetermined lens comprises:

installing the predetermined lens in front of the computer-generated hologram element to reflect the test beams transmitted through the predetermined lens along a same optical path as the transmitted test beams.

17. The method or claim 13, wherein the installing of the predetermined lens comprises;

installing the predetermined lens after the computer-generated hologram element to perpendicularly reflect the test beams transmitted through the computer-generated hologram from an incident surface of the predetermined lens to travel along a same optical path as the transmitted test beams.

18. The method of claim 13, wherein the measuring of the manufacturing condition of the barrel comprises:

measuring the interference patterns according to a difference between the interference patterns and null interference patterns.

19. A method of measuring an alignment error in an optical system, having at least one optical element, the method comprising:

providing a computer generated hologram element on a same optical path as the at least one optical element;

generating an interference pattern on an image surface between a reference beam and a test beam reflected or refracted by the hologram element; and determining a magnitude of the alignment error of the optical element according to a number of circles in the interference pattern.

20. The method of claim 19, further comprising:
determining a direction of the alignment error according to a displacement of a center of the interference pattern from a center of the image surface.

21. An optical system having included features for measuring an alignment error of the optical system, the optical system comprising:
a barrel; and
at least one optical element mounted in the barrel, the at least one optical element having a computer generated hologram written on a peripheral area of the optical element, wherein;
the computer generated hologram is usable with an external interferometer to generate an interference pattern on an image surface of the interferometer between a reference beam of the interferometer and a test beam of the interferometer which is reflected or refracted by the hologram element,
a magnitude of the alignment error of the optical element is determinable according to a number of circles in the interference pattern, and
a direction of the alignment error is determinable according to a displacement of a center of the interference pattern from a center of the image surface.

22. The optical system at claim 21, wherein the computer generated hologram is ring shaped.

23. The optical system of claim 21, wherein the computer generated hologram is fan shaped.

* * * * *

UNITED STATES PATENT AND TRADEMARK OFFICE
CERTIFICATE OF CORRECTION

PATENT NO. : 6,930,783 B2
DATED : August 16, 2005
INVENTOR(S) : Tae-hee Kim

It is certified that error appears in the above-identified patent and that said Letters Patent is hereby corrected as shown below:

Column 10,
Line 44, replace "or" with -- of --;
Line 45, replace "comprises;" with -- comprises: --;

Column 11,
Line 12, replace "wherein;" with -- wherein: --;

Column 12,
Line 11, replace "at" with -- of --.

Signed and Sealed this

Ninth Day of May, 2006

JON W. DUDAS
*Director of the United States Patent and Trademark Office*